United States Patent [19]

Foster et al.

[11] Patent Number: 5,721,279
[45] Date of Patent: Feb. 24, 1998

[54] MANUFACTURE OF CATION EXCHANGE RESINS BY PRESSURIZED SULFONATION

[75] Inventors: Kenneth L. Foster, Midland; Natalie N. Westphal, Saginaw; Suresh Subramonian, Midland, all of Mich.

[73] Assignee: The Dow Chemical Company, Midland, Mich.

[21] Appl. No.: 789,451

[22] Filed: Jan. 27, 1997

[51] Int. Cl.$^6$ ............................................. C08F 8/36
[52] U.S. Cl. ................... 521/33; 521/30; 521/38; 525/343; 525/344; 525/353; 525/354
[58] Field of Search ............................ 521/33; 525/343, 525/344, 353, 354

[56] References Cited

U.S. PATENT DOCUMENTS

| | | |
|---|---|---|
| 2,638,445 | 5/1953 | Young . |
| 4,113,765 | 9/1978 | Richardson et al. . |
| 4,209,592 | 6/1980 | Akiyama et al. ................ 521/33 |
| 5,081,160 | 1/1992 | Strom et al. ...................... 521/29 |
| 5,523,327 | 6/1996 | Song et al. ........................ 521/32 |

OTHER PUBLICATIONS

Helfferich, "Ion Exchange", (1962), 36–38, (McGraw–Hill).

Primary Examiner—Fred Zitomer

[57] ABSTRACT

Cation exchange resins are prepared by sulfonating copolymer beads in the presence of a swelling solvent under pressure. Pressure sulfonation shortens cycle times and requires less energy while maintaining or improving product quality.

10 Claims, No Drawings

MANUFACTURE OF CATION EXCHANGE RESINS BY PRESSURIZED SULFONATION

FIELD OF INVENTION

The present invention concerns a method of manufacturing strong acid cation exchange resins by pressurized sulfonation. More particularly, the present invention concerns the sulfonation of styrene-divinylbenzene or other crosslinked vinyl copolymer beads in the presence of a swelling solvent at superatmospheric pressure.

BACKGROUND OF THE INVENTION

Cation exchange resins, which are commercially useful in water treatment applications, are conventionally prepared by sulfonating styrene-divinylbenzene copolymers or other crosslinked vinyl copolymers having aromatic rings in the presence of a swelling solvent. In general, sulfonated cation exchange resins are prepared by contacting the copolymer beads in the presence of a swelling agent with a sulfonating agent at an elevated temperature for a time sufficient to achieve the desired degree of sulfonation. U.S. Pat. No. 5,081,160 teaches that suitable swelling agents are halogenated hydrocarbons such as, for example, methylene chloride or ethylene dichloride. Sulfonation is known to progress by a shell progressive mechanism in which sulfonic acid groups are substituted substantially within a continuous shell that is disposed about a central, unfunctionalized copolymer core; see G. Schmuckler et al. in *Ion Exchange and Solvent Extraction*, Vol. 7, Chapter 1, pp. 1–27, Marcel Dekker Inc., 1974. The use of a swelling agent usually produces a smoother interface between sulfonated and unsulfonated portions of the copolymer beads and facilitates attaining a high ion exchange capacity, i.e., a high degree of functionalization.

U.S. Pat. No. 4,209,592 recognizes that halogenated hydrocarbon swelling agents are useful for avoiding a high degree of resin bead fragmentation encountered in sulfonation conducted in the absence of the halogenated hydrocarbon. U.S. Pat. No. 5,523,327 teaches that the same effect can be achieved with saturated hydrocarbon swelling agents. Both patents disclose that sulfonation is usually carried out at atmospheric pressure; however, when high boiling saturated hydrocarbon swelling agents are used, the sulfonation is preferably conducted under reduced pressure. Conventional wisdom suggests that conducting sulfonations under increased pressures would seriously compromise product quality, i.e., increase bead rupture.

In addition to water treatment, cation exchange resins are used in certain applications, e.g., as a pharmaceutical useful for controlling potassium in kidney dialysis patients, in which bead color and appearance are important. But conventional sulfonation procedures do not give a product of consistent color and appearance. It would be desirable to have a sulfonation process that provides consistently light colored product. As with all manufacturing operations, it is also desirable to have a process that has shorter cycle times and requires less energy while maintaining or improving product quality.

SUMMARY OF THE INVENTION

The present invention concerns an improved sulfonation process for manufacturing cation exchange resins in which copolymer beads of a monovinylidene aromatic monomer and a polyvinylidene crosslinking monomer are contacted with a sulfonating agent in the presence of a swelling solvent wherein the improvement comprises conducting the sulfonation under pressure. Pressure increases the boiling point of the swelling solvent and delays its boil off. By keeping the copolymer swelled at temperatures above the swelling solvent's normal boiling point, sulfonation proceeds at significantly lower temperatures. The lower temperatures in turn allow the consistent production of light colored resin. By running the reaction at lower temperature, both heat up and cool down times are shortened, reducing the overall cycle time and increasing plant capacity. Pressure also helps keep foaming to a minimum, particularly during the removal of the swelling solvent. Pressure sulfonation imparts all of the advantages of using a high boiling swelling solvent without the disadvantages associated with the recovery of high boiling solvents in general and without compromising product quality.

DETAILED DESCRIPTION OF THE INVENTION

In the present invention, cation exchange resins are obtained by sulfonating copolymer beads of a monovinylidene aromatic monomer and a polyvinylidene crosslinking monomer with a sulfonating agent in the presence of a swelling solvent under pressure.

Cation exchange resins refer to copolymer beads containing aromatic rings substituted with sulfonic acid groups or the corresponding sulfonate salts.

The method used to prepare the copolymer beads is not critical to realize the benefits of this invention. As such, the copolymer beads may be prepared by any process known in the art. Such methods include, for example, a single-stage suspension polymerization process as described by F. Helfferich, *Ion-Exchange*, (McGraw-Hill, 1962) at pages 35 and 36, wherein a water-immiscible monomer phase is suspension polymerized in a continuous aqueous phase to produce spheroidal copolymer beads. Also suitable for preparing the copolymer bead matrix is a multi-staged, or seeded, suspension polymerization process. A multi-stage polymerization adds monomers in two or more increments. Each increment is followed by substantial polymerization of the monomers before adding a subsequent increment. Seeded polymerizations, as well as continuous or semicontinuous staged polymerizations, are described in U.S. Pat. Nos. 4,419,245 and 4,564,644.

Monomers suitable for preparing copolymer beads are addition polymerizable ethylenically unsaturated compounds. Typically, a major portion of at least one monovinylidene aromatic compound is polymerized with a minor portion of an addition polymerizable polyvinylidene compound which acts as a crosslinking monomer. Of particular interest are water-insoluble monovinylidene aromatics such as styrene, vinyltoluene, ethylvinylbenzene, vinylnaphthalene and vinylbenzyl chloride and polyvinylidene crosslinkers such as divinylbenzene and trivinylbenzene. Preferred monovinylidene aromatic monomers are styrene, ethylvinylbenzene and mixtures thereof. The preferred polyvinylidene crosslinking monomer is divinylbenzene.

The copolymer beads are prepared from monomer mixtures which include at least one monovinylidene aromatic monomer in an amount of from about 88 to about 99.5 weight percent, preferably from about 90 to about 98.5 weight percent, and more preferably from about 92 to about 98 weight percent based on the weight of monomers in the mixture, with the balance of the monomers being a polyvinylidene crosslinking monomer. Such monomer mixtures typically include free-radical polymerization initiators which are well-known in the art, such as azo compounds like azobisisobutyronitrile and peroxy compounds like benzoyl peroxide, t-butyl peroctoate, t-butyl perbenzoate and isopropyl percarbonate.

A diluent which is substantially inert under polymerization conditions may also be incorporated into the monomer phase to obtain macroporous copolymer beads. The term "macroporous" (also referred to as macroreticular) is well-known in the art and, in general, refers to resins prepared from copolymer beads which have regions of densely packed polymer chains exhibiting molecular-sized porosity which are separated by copolymer-free voids, often referred to as mesopores (5–20 nanometers (nm)) and macropores (>20 nm). In contrast, microporous, or gel-type, resins have pores generally of molecular-size (less than about 5 nm) and are prepared from monomer mixtures which do not employ an inert diluent. Macroporous and gel resins are further described in U.S. Pat. Nos. 4,224,415 and 4,382,124.

Suitable inert diluents are those which are a solvent for the monomer mixture, but not the resulting copolymer. Accordingly, use of an inert diluent results in phase separation of the copolymer from the monomer phase during polymerization. Inert diluents are generally organic compounds having boiling points greater than about 60° C. and include, for example, aromatic hydrocarbons, aliphatic hydrocarbons, alcohols, and halogenated hydrocarbons. Preparation of macroporous copolymer beads is well-known in the art. The benefits of the present invention are obtained with either macroporous or gel copolymer beads.

In general, sulfonated cation-exchange resins are prepared by contacting the copolymer beads with a sulfonating agent at an elevated temperature and for a time sufficient to achieve a desired degree of sulfonation. Suitable sulfonating agents include concentrated sulfuric acid, i.e., acid having a sulfuric acid concentration greater than about 90 percent based on total weight; oleum; chlorosulfonic acid; or sulfur trioxide. A preferred sulfonating agent is sulfuric acid, preferably 98 percent sulfuric acid. The amount of concentrated sulfuric acid employed is advantageously that which is sufficient to provide adequate mixing during reaction, with a weight ratio of acid to beads of from about 4.5:1 to about 16:1 being generally sufficient. The preferred weight ratio of acid to beads is about 5:1 to about 6.5:1. Suitable temperatures for sulfonation with sulfuric acid are from about 20° to about 150° C. It is desirable to maintain a temperature of from about 40° to about 140° C., preferably from about 60° to about 130° C., and most preferably from about 70° to about 110° C.

Sulfonation of the copolymer beads with sulfuric acid is preferably conducted in the presence of a swelling solvent. Suitable swelling solvents are known in the art and include, for example, halogenated hydrocarbons like methylene chloride and ethylene dichloride and saturated hydrocarbons like cyclohexane and iso-octane. The amount of swelling solvent is preferably sufficient to give a weight ratio of swelling solvent to copolymer beads from about 0.1 to about 1.6, most preferably from about 0.2 to about 0.5. Typically, the copolymer beads are contacted with the swelling agent prior to sulfonation for a time sufficient to substantially swell the beads, generally at least about 10 minutes.

The gist of the present invention is directed to conducting the sulfonation under pressure. By "under pressure" is meant operation at pressures greater than atmospheric pressure. The advantage of operating under superatmospheric pressure is to effectively increase the boiling point of the swelling solvent to keep the copolymer swelled at temperatures above the swelling solvent's normal boiling point. Too high a pressure, however, can promote bead rupture. While operation at pressures above, for example, 100 pounds per square inch gauge (psig) [790 kilopascals (kPa)] may not be detrimental, neither is it any more beneficial for the usual swelling solvents employed. External pressure can be applied; however, it is preferable to run the reaction under autogenous pressure, i.e., under the pressure naturally developed by conducting the sulfonation in a closed or partially closed vessel.

After sulfonation, the reaction vessel is vented and the resin is hydrated and, if desired, converted to a metal salt. Alternatively, some pressure can be released during the sulfonation reaction for ease of other process considerations, such as improving cycle time.

In a typical reaction, a pressure reactor is loaded with sulfonating agent, copolymer and swelling solvent and is then purged with nitrogen, evacuated and sealed. The contents of the reactor are heated to the desired temperature until reaction is complete, generally in from about 0.25 to about 3 hours. A fixed pressure can be maintained by releasing some of the swelling solvent during the reaction. After completion of the reaction, the pressure is slowly released and the swelling solvent is removed. After cooling, the resin is hydrated and recovered.

The following examples further illustrate the present invention.

EXAMPLE 1

A 1-liter (L) Hastelloy B or C pressure reactor was equipped with a process controller and a pressure relief device set at 75 psig (627 kPa). Reactor temperature was controlled by external electric heating and water cooling. Reactor pressure was monitored by a transducer and controlled by a pressure regulating valve. The reactor was loaded with 100 parts of a 10 percent divinylbenzene (DVB) copolymer of styrene, 500 parts of 98 percent $H_2SO_4$ and from 10 to 160 parts of methylene chloride ($MeCl_2$) as the swelling solvent. The reactor was purged with nitrogen, evacuated and sealed. The reactor was heated to the reaction temperature and held at that temperature for a prescribed time. The pressure was released and the solvent was removed using reduced pressure to speed up the final stages of removal. The resin was hydrated, washed and dried. Dry weight capacity (DWC) was determined by titration and compared to theoretical DWC [5.32 milliequivalents per gram (meg/g)] to calculate degree of sulfonation (DWC/theoretical DWC). The results are summarized in Table I.

TABLE I

Pressure Sulfonation Data for 10 percent DVB Copolymer of Styrene

| Run No. | Temp. °C. | $P_{max}$ psig | $P_{max}$ kPa | Time Hr. | $MeCl_2$ Parts | Percent Sulfonation |
|---|---|---|---|---|---|---|
| 1 | 70 | 20 | 238 | 0.5 | 80 | 93 |
| 2 | 70 | 25 | 272 | 2 | 80 | 95 |
| 3 | 80 | 10 | 169 | 0.5 | 40 | 91 |
| 4 | 80 | 14 | 196 | 1 | 40 | 96 |
| 5 | 80 | 24 | 265 | 1 | 40 | 96 |
| 6 | 90 | 45 | 410 | 2 | 160 | 97 |
| 7 | 90 | 35 | 341 | 2 | 80 | 97 |
| 8 | 90 | 18 | 224 | 0.5 | 80 | 97 |
| 9 | 90 | 10 | 169 | 1 | 50 | 97 |
| 10 | 90 | 24 | 265 | 1 | 40 | 97 |

TABLE I-continued

Pressure Sulfonation Data for 10 percent DVB Copolymer of Styrene

| Run No. | Temp. °C. | P$_{max}$ psig | P$_{max}$ kPa | Time Hr. | MeCl$_2$ Parts | Percent Sulfonation |
|---|---|---|---|---|---|---|
| 11 | 90 | 20 | 238 | 1 | 40 | 97 |
| 12 | 90 | 10 | 169 | 1 | 40 | 97 |
| 13 | 90 | 30 | 306 | 1.5 | 40 | 97 |
| 14 | 90 | 18 | 224 | 1.5 | 40 | 97 |
| 15 | 90 | 22 | 251 | 0.5 | 40 | 97 |
| 16 | 90 | 17 | 217 | 0.5 | 30 | 95 |
| 17 | 90 | 14 | 196 | 0.5 | 20 | 91 |
| 18 | 90 | 11 | 176 | 0.5 | 10 | 80 |
| 19 | 95 | 24 | 265 | 1 | 40 | 97 |
| 20 | 100 | 45 | 410 | 1 | 40 | 97 |
| 21 | 100 | 25 | 272 | 1 | 40 | 97 |
| 22 | 100 | 10 | 169 | 0.5 | 40 | 97 |

EXAMPLE 2

The procedure of Example 1 was repeated using an 8 percent DVB copolymer of styrene and from 30 to 40 parts MeCl$_2$ as the swelling solvent. The theoretical DWC was 5.34 meq/g. The results are summarized in Table II.

TABLE II

Pressure Sulfonation Data For 8 Percent DVB Copolymer of Styrene

| Run No. | Temp. °C. | P$_{max}$ psig | P$_{max}$ kPa | Time Hr. | MeCl$_2$ Parts | Percent Sulfonation |
|---|---|---|---|---|---|---|
| 1 | 90 | 20 | 238 | 1 | 40 | 99 |
| 2 | 90 | 20 | 238 | 0.5 | 40 | 98 |
| 3 | 90 | 10 | 169 | 2 | 40 | 99 |
| 4 | 90 | 10 | 169 | 1 | 40 | 98 |
| 5 | 90 | 10 | 169 | 0.5 | 40 | 98 |
| 6 | 90 | 10 | 169 | 0.5 | 30 | 96 |
| 7 | 80 | 14 | 196 | 0.5 | 40 | 97 |
| 8 | 80 | 10 | 169 | 0.5 | 40 | 96 |

EXAMPLE 3

The procedure of Example 1 was repeated using a 5.7 percent DVB copolymer of styrene and from 20 to 40 parts MeCl$_2$ as the swelling solvent. The theoretical DWC was 5.37 meq/g. The results are summarized in Table III.

TABLE III

Pressure Sulfonation Data For 5.7 Percent DVB Copolymer of Styrene

| Run No. | Temp. °C. | P$_{max}$ psig | P$_{max}$ kPa | Time Hr. | MeCl$_2$ Parts | Percent Sulfonation |
|---|---|---|---|---|---|---|
| 1 | 90 | 20 | 238 | 1 | 40 | 99 |
| 2 | 90 | 20 | 238 | 0.5 | 40 | 99 |
| 3 | 90 | 10 | 169 | 1 | 40 | 99 |
| 4 | 90 | 10 | 169 | 1 | 30 | 99 |
| 5 | 90 | 10 | 169 | 1 | 20 | 98 |
| 6 | 90 | 10 | 169 | 0.5 | 40 | 99 |
| 7 | 80 | 14 | 196 | 1 | 40 | 97 |
| 8 | 80 | 10 | 169 | 1 | 40 | 97 |

What is claimed is:

1. An improved sulfonation process for manufacturing cation exchange resins in which copolymer beads of a monovinylidene aromatic monomer and a polyvinylidene crosslinking monomer are contacted with a sulfonating agent in the presence of a swelling solvent wherein the improvement comprises conducting the sulfonation under pressure sufficient to increase the boiling point of the swelling solvent to keep the copolymer beads swelled at temperatures above the normal boiling point of the swelling solvent without rupturing the beads.

2. The process of claim 1 in which the sulfonation is conducted at autogenous pressure.

3. The process of claim 1 in which the monovinylidene aromatic monomer is styrene, ethyl vinylbenzene or mixtures thereof.

4. The process of claim 3 in which the sulfonation is conducted at autogenous pressure.

5. The process of claim 1 in which the swelling solvent is methylene chloride.

6. The process of claim 5 in which the sulfonation is conducted at autogenous pressure.

7. The process of claim 1 in which the sulfonating agent is concentrated sulfuric acid.

8. The process of claim 7 in which the sulfonation is conducted at autogenous pressure.

9. An improved sulfonation process for manufacturing cation exchange resins in which copolymer beads of styrene-divinylbenzene are contacted with concentrated sulfuric acid in the presence of methylene chloride wherein the improvement comprises conducting the sulfonation under pressure sufficient to increase the boiling point of the methylene chloride to keep the copolymer beads of styrene-divinylbenzene swelled at temperatures above the normal boiling point of methylene chloride without rupturing the beads.

10. The process of claim 9 in which the sulfonation in conducted at autogenous pressure.

* * * * *